United States Patent [19]
Athas et al.

[11] Patent Number: 5,559,478
[45] Date of Patent: Sep. 24, 1996

[54] HIGHLY EFFICIENT, COMPLEMENTARY, RESONANT PULSE GENERATION

[75] Inventors: William C. Athas, Redondo Beach; Lars G. Svensson, Santa Monica, both of Calif.

[73] Assignee: University of Southern California, Los Angeles, Calif.

[21] Appl. No.: 503,169

[22] Filed: Jul. 17, 1995

[51] Int. Cl.$^6$ ....................... H02M 7/5383; H03K 3/354
[52] U.S. Cl. ................................... 331/117 FE; 307/108; 320/1; 327/304; 363/131
[58] Field of Search ..................... 331/117 R, 117 FE; 307/108; 320/1; 327/291, 304; 363/109, 131, 132, 135, 136, 139

[56] References Cited

U.S. PATENT DOCUMENTS

| | | | |
|---|---|---|---|
| 4,107,757 | 8/1978 | Masuda et al. | 320/1 |
| 4,328,525 | 5/1982 | Allen et al. | 361/152 |
| 4,605,999 | 8/1986 | Bowman et al. | 363/19 |
| 4,707,692 | 11/1987 | Higgins et al. | 340/825.81 |
| 4,862,113 | 8/1989 | Buhler et al. | 331/117 R |
| 4,920,474 | 4/1990 | Bruning et al. | 363/97 |
| 5,051,668 | 9/1991 | Kawaberi et al. | 315/408 |
| 5,107,136 | 4/1992 | Stekelenburg | 307/269 |
| 5,150,013 | 9/1992 | Bobel | 315/209 R |

OTHER PUBLICATIONS

RCA Transistor Thyristor & Diode Manual, RCA Solid State Division Somerville, N.J. Apr. 1971, pp. 180–183.
A MOS Gate Drive With Resonant Transitions. Maksimovic, Proc. IEEE Power Electronics Specialists Conf. IEEE Press, 1991, pp. 527–531.
Reversible Logic Issues In Adiabatic CMOS, Athas et al, Proceedings of PhysComp 94 17–20 Nov. 1994, Dallas, Texas, IEEE Press.
An Energy–Efficient CMOS Line Driver Using Adiabatic Switching, Athas et al., University of Southern California, Information Sciences Institute, Aug. 5, 1993, pp. 1–16.
Low–Power Digital Systems Based On Adiabatic–Switching Principles Athas et al, IEEE Trans. on VLSI Systems, vol. 2, No. 4, Dec. 1994, pp. 398–407.
An Energy–Efficient CMOS Line Driver Using Adiabatic Switching, Athas et al., IEEE Publication 1066–1395/94, 1994, pp. 196–199.

*Primary Examiner*—Siegfried H. Grimm
*Attorney, Agent, or Firm*—Poms, Smith, Lande & Rose, Professional Corporation

[57] ABSTRACT

A power source, inductor and clamping device coupled to generate substantially sinusoidal drive pulses. The power source has an output capacitance. The inductor is connected to the power source and to the load to be driven. In combination with the inductor, the output capacitance of the power source and the input capacitance of the load to be driven create a resonant circuit which generates a stream of substantially sinusoidal pulses. A clamping device is connected to the inductor and prevents the stream of pulses which are driving the load from exceeding a clamping level. In one preferred embodiment, a complementary set of clamping devices and inductors are used to generate a complementary set of pulse streams.

26 Claims, 5 Drawing Sheets

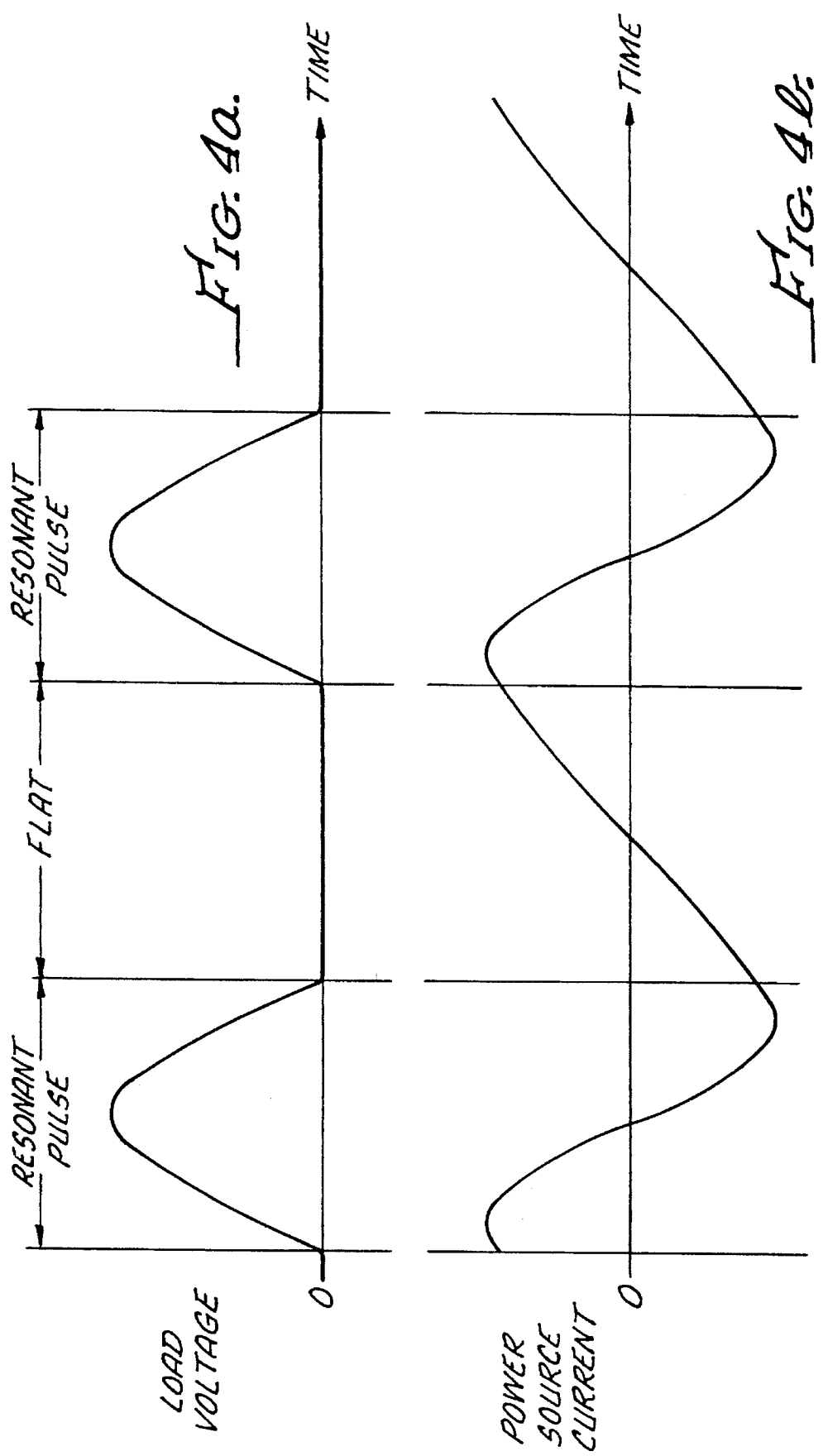

HIGHLY EFFICIENT, COMPLEMENTARY, RESONANT PULSE GENERATION

This invention was made with government support under DABT63-92-C0052 awarded by ARPA. The government has certain rights in the invention.

BACKGROUND OF THE INVENTION

1. Field of the Invention

This invention relates to systems for generating pulses and, more particularly, to systems which generate pulses for supplying loads having significant capacitive reactance.

2. Description of Related Art

Many applications in electronics require a driving signal consisting of a series of pulses. Such applications exist in the fields of digital, analog, electro-mechanical and power electronics, among others.

Many of these applications present a load having significant capacitive reactance. In turn, this is a source of significant power dissipation.

Many applications require low power dissipation. One example is portable computers. As is well known, portable computers run on batteries. The length of time the portable computer can run on a single charge is often a very important specification.

Mathematically, the power P dissipated by a system having a capacitance C and being cycled through a voltage V at a frequency F is:

$$P = D \cdot F \cdot CV^2$$

where D is the dissipation factor and reflects the energy efficiency of the circuit. For non-resonant systems, D is usually equal to 1 or higher. In resonant systems, the value of D can be reduced to substantially less than one.

One of the simplest ways to generate cyclic signals which have small dissipation factors is with a tuned circuit, such as an LC-tank. This type of circuit supplies a sinusoidal current and voltage waveform to the capacitive load.

Although LC-tank circuits are straightforward to operate with high efficiency, they are generally unsuitable for powering capacitive loads with "digital" properties. Typically, these applications require a multiplicity of pulse signals in the form of repetitive pulse trains with little or no overlap between pulses and with sizable "off" intervals during which individual pulse signals remain at near-zero levels. The most well-known of these timing methodologies for digital VLSI circuits is two-phase, non-overlapping clocking. See L. A. Glasser, D. W. Dobberpuhl, "The Design and Analysis of VLSI Circuits," Addison-Wesley, Reading, 1985 Other examples include:

1. the row and column select lines of an LCD matrix;
2. micro-electromechanical devices;
3. on-chip gate and parasitic capacitance of a MOS VLSI chip;
4. off-chip capacitive loads (e.g., I/O pads) of a MOS VLSI chip;
5. bootstrapped circuits; see R. E. Joynson, J. L. Mundy, J. F. Burgess, C. Neugebauer, . . . "Eliminating Threshold Losses in MOS Circuits by Boot-Strapping Using Varactor Coupling," IEEE Jnl of Solid-State Circuits, SC- 7, No. 3, June 1972; C. L. Seitz, A. H. Frey, S. Mattisson, S. D. Rabin, D. A. Speck, J. L. A. van de Snepscheut, "Hot-Clock nMOS, " Proc. of the 1985 Chapel-Hill Conf on VLSI, . Apr. 1985; L. A. Glasser, D. W. Dobberpuhl, "The Design and Analysis of VLSI Circuits," Addison-Wesley, Reading, 1995; N. Tzartzanis, W. C. Athas, "Design and Analysis of a Low Power Energy-Recovery Adder," Fifth Great Lakes Symposium on VLSI, Mar. 1995; and W. C. Athas, "Energy-Recovery CMOS," (Massoud Pedram, editor) Kluwer Academic Publishers, 1995;
6. energy-recovery CMOS circuits; see N. Tzartzanis, W. C. Athas, "Design and Analysis of a Low Power Energy-Recovery Adder," Fifth Great Lakes Symposium on VLSI, Mar. 1995; W. C. Athas, "Energy-Recovery CMOS," (Massoud Pedram, editor) Kluwer Academic Publishers, 1995 and S. G. Younis, "Asymptotically Zero Energy Computing Using Split-Level Charge Recovery Logic," Ph.D. thesis, Massachusetts Institute of Technology, June 1994; and
7. adiabatic CMOS circuits; see W. C. Athas, L. Svensson, J. G. Koller, N. Tzartzanis, E. Y.-C. Chou, "Low-Power Digital Systems Based on Adiabatic-Switching Principles," IEEE Trans. on VLSI System, Vol 2, No. 4, Dec. 1994 and J. S. Denker, "A Review of Adiabatic Computing," 1994 IEEE Symposium on Low Power Electronics, Oct. 1994.

An LC-tank circuit with a split capacitive load provides two-phase symmetrical sinusoidal signals 180° out of phase. However, the signals are often not useful for clocking purposes because of the significant overlap between the phases and the almost-zero off interval.

Thus, there continues to be a very substantial need for pulse generation systems which can drive loads having significant capacitive reactance with a minimum of power dissipation.

SUMMARY OF THE INVENTION

One object of the present invention is to obviate these and other problems in the prior art.

Another object of the present invention is to provide a pulse generation system which drives loads having significant capacitive reactance, but which dissipates a small fraction of the power of traditional methods.

Another object of the present invention is to provide a pulse generation system which provides a multiplicity of pulse signals in the form of repetitive pulse trains with little or no overlap between the pulses and with sizable "off" intervals during which individual pulse signals remain at near-zero levels.

Another object of the present invention is to provide a pulse generation system which provides an output voltage that is substantially independent of load capacitance.

Another object of the present invention is to provide a pulse generation system which has a pulse frequency that automatically adjusts to the load capacitance.

Another object of the present invention is to provide a pulse generation system which works effectively with loads having a capacitive reactance which, although symmetric, is not constant.

Another object of the present invention is to provide a pulse generation system which does not have significant inductor ringing.

These and still further objects, features and benefits of the present invention are achieved by combining a power source with an inductor and clamping device. The power source has an output device that can absorb energy returned from the load. In the simplest case, this device is an output capacitor. The output capacitor has a value which is large in comparison to the magnitude of the effective load capacitance.

The inductor is connected to the power source and to the load to be driven. In combination with the inductor, the output capacitance of the power source and the input capacitance of the load to be driven create a resonant circuit. This circuit, if not otherwise controlled, will naturally support a continuous, sinusoidal waveform. The introduction of the clamping device, under proper control, exploits the energy-storing property of the inductor to create a stream of resonant pulses which have a substantially sinusoidal shape. The clamping device is activated during the off interval and accomplishes the following four functions:

1. keeps the output voltage at a near-zero level;
2. steers the inductor current;
3. returns and extracts energy from the power source; and
4. replenishes the circuit's energy losses from the power source.

In a preferred embodiment, a complementary set of clamping devices and inductors are used to generate a complementary set of pulse streams. Significantly, the driving input to each clamping device is derived from the pulse train output of the complementary device.

In one preferred embodiment, the clamping device includes an electronic switch which preferably is a MOSFET. The switching frequency is less then the frequency at which the inductor and output capacitance of the power source and input capacitance of the load would naturally resonate. In a preferred embodiment, the operating frequency has a period which is about 0.458 radians longer then the period of the resonant frequency.

The power source is preferably a DC power source.

These as well as still further features, objects and benefits of the present invention will now become clear from an examination of the drawings, taken in conjunction with the Detailed Description of the Preferred Embodiments.

BRIEF DESCRIPTION OF THE DRAWINGS

FIG. 4 is a diagram of certain operating characteristics of the embodiment of the invention shown in FIG. 2.

DETAILED DESCRIPTION OF THE PREFERRED EMBODIMENTS

Figure 1:
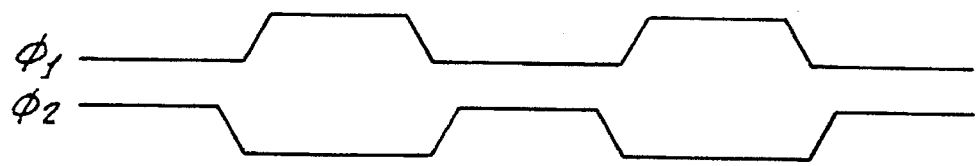
FIG. 1 illustrates a stream of typical two-phase, non-overlapping clocking signals.

FIG. 1 illustrates a stream of typical two-phase, non-overlapping clocking signals. One is labeled $\phi_1$; the other $\phi_2$. As can be seen from FIG. 1, these signals comprise transitions between two voltage levels, separated by intervals where the voltage is substantially constant. When used as clocking inputs to a typical VLSI circuit having significant capacitive reactance at its input, substantial energy losses usually result.

Figure 2:
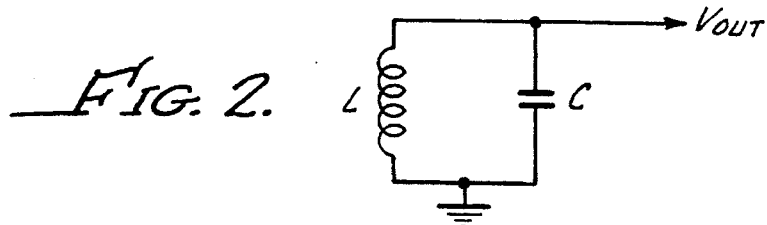
FIG. 2 is a diagram of a simple LC-tank circuit.

FIG. 2 illustrates a typical LC-tank circuit. As is well known, such a circuit generates a sinusoidal signal. Although such a signal usually causes less power losses when used to drive a capacitive load, such a signal is usually unsuitable for powering capacitive loads with "digital properties." These are applications which require a multiplicity of pulse signals in the form of repetitive pulse trains with little or no overlap between pulses and with sizable "off" intervals during which individual pulse signals remain at near-zero levels.

Figure 3:
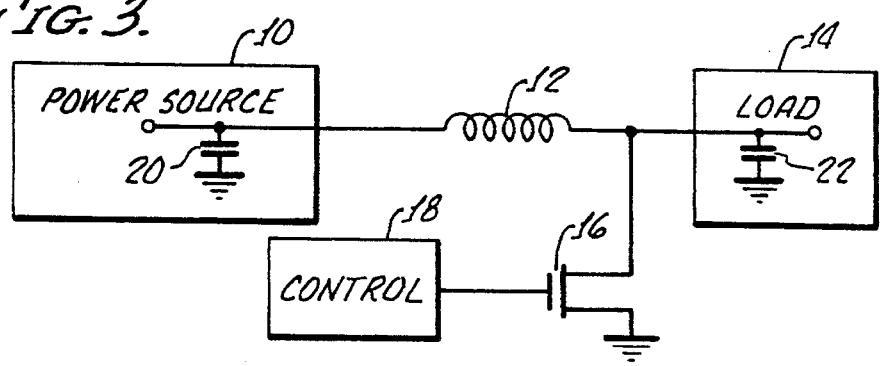
FIG. 3 is a diagram of one embodiment of the present invention.

FIG. 3 is a diagram of one embodiment of the present invention. As shown in FIG. 3, a power source 10 is connected through an inductor 12 to a load 14. A MOSFET 16 is connected so as to clamp the output from the inductor 12 which is delivered to the load 14 to ground when receiving a control signal from a control 18.

The power source 10 typically has an output device that can absorb energy returned from the load. In the simplest case, this device is a capacitor 20. The presence of the capacitor 20 at the output of the power source 10 causes the power source 10 to have an output capacitance. This is a typical configuration for most dc supplies.

The load 14 is intended to be representative of a broad variety of devices which require an input stream of pulses. Such devices can be in the fields of digital, analog, electromechanical and power electronics, as well as other fields. They include:

1. the row and column select lines of an LCD matrix;
2. micro-electromechanical devices;
3. on-chip gate and parasitic capacitance of a MOS VLSI chip;
4. off-chip capacitive loads (e.g., I/O pads) of a MOS VLSI chip;
5. bootstrapped circuits;
6. energy-recovery CMOS circuits; and
7. adiabatic CMOS circuits.

A capacitor 22 is shown as being strapped across the input to the load 14. In practice, a single capacitor is often not actually present. The capacitor 22 is nevertheless included in the illustration of the load 14 in FIG. 3 simply to illustrate the very real presence of capacitive reactance which the load 14 presents at its input. Typically, this capacitive reactance is created by the wiring within the load 14, the devices connecting the load (such as pads), and the intrinsic capacitance of the devices which are used in the load (such as semiconductors) The capacitor 22 is intended to illustrate the collective sum of all of these sources of capacitive reactance.

In many applications, the input capacitance to the load 14, which is illustrated in FIG. 3 as the capacitor 22, is of sufficient magnitude to cause the dissipation of significant power during transitions of the pulses which are received by the load 14. This is particularly true when no attempt is made to use resonant circuits to decrease dissipation.

Mathematically, the power which is dissipated in such a system because of an input capacitance C and a cycling input signal which swings through a voltage V at a frequency F is:

$$P = D \cdot F \cdot C V^2, \qquad (EQ.\ 1)$$

where D is the dissipation factor and reflects the efficiency of the circuit. In non-resonant systems, D is typically 1 or larger. In resonant systems, D can be made much smaller than 1.

Unfortunately, the typical resonant system provides virtually no off interval between pulses, its output signals reverse in polarity, and it is unsuitable to generating split phases with little or no overlap. As a consequence, the typical resonant system is not suitable for providing drive pulses to capacitive loads having "digital" properties, such as the following:

1. the row and column select lines of an LCD matrix;
2. micro-electromechanical devices;
3. on-chip gate and parasitic capacitance of a MOS VLSI chip;
4. off-chip capacitive loads (e.g., I/O pads) of a MOS VLSI chip;
5. bootstrapped circuits;
6. energy-recovery CMOS circuits; and
7. adiabatic CMOS circuits.

The present invention continues to provide many of the benefits of an LC-tank drive, but without many of its detriments. The manner in which this is achieved is most easily understood by reference to FIG. 4, in combination with FIG. 3.

FIG. 4 is a diagram of certain operating characteristics of the embodiment of the invention shown in FIG. 3. FIG. 4(a) is a diagram of the voltage which is delivered to the load 14 shown in FIG. 3. FIG. 4(b) is a diagram of the current flowing in the inductor 12 in FIG. 3.

As is illustrated in FIG. 4(a), the voltage which is delivered to the load 14 consists of a series of resonant "pulses" separated by a series of flat segments. Each resonant pulse is substantially sinusoidal. Each flat segment is substantially a constant voltage of near-zero magnitude.

Each flat segment is caused by the MOSFET 16 clamping the input to the load 14 to ground. For this to happen, the control 18 must generate a control signal which, when delivered to the gate of the MOSFET 16, causes the MOSFET to switch on.

FIG. 4(b) illustrates the current which flows through the power source 10 and the inductor 12 when the control 18 is functioning to create the flat segments shown in FIG. 4(a). As can be seen from FIG. 4(b), current is flowing from the power source 10 into the load 14 during the first half of each resonant pulse. During the second half of each resonant pulse, however, current is flowing from the load 14 back into the power source 10.

Thus, the output capacitor 20 of the power source 10 effectively absorbs and stores power from the load 14 on a periodic basis. As should also be evident to those skilled in the art, the inductor 12 is also absorbing and storing energy from the load 14 on a periodic basis.

During the period of each resonant pulse, the following equations govern the current and voltage for a highly underdamped system:

$$I_o = V_o \sqrt{L/C} ,\qquad (Eq.\ 2)$$

$$\omega^2 = 1/(LC), \qquad (Eq.\ 3)$$

$$I(t) = I_o \cos\omega t, \qquad (Eq.\ 4)$$

$$V(t) = V_o \sin\omega t, \qquad (Eq.\ 5)$$

where $I_o$ is the peak current, $V_o$ is the peak voltage, L is the value of the inductor 12, $\omega$ is the angular frequency, t is time, and C is the value of the series connection of the output capacitance 20 and the input capacitance 22.

In most applications, the input capacitance 22 will be many times smaller in magnitude then the output capacitance 20. In such situations, the value of C will be approximately equal to the value of the input capacitance 22.

The inductor 12 and clamping device 16 accomplish four functions during the flat segment: 1. reverse the direction of the current from negative to positive; 2. clamp the load voltage to a near-zero level; 3. replenish the circuit energy losses from the power source; and return and then extract energy from the power source.

During the first-half of the flat segment, the clamping device 16 moves charge from the ground potential to that of the voltage potential of the power source 10. This action causes the current to decrease at approximately a linear rate. Once the current has reached zero, the positive voltage across the inductor 12 causes energy to be extracted from the power source 10 and stored in the inductor 12. For these modes of operation to be possible, the voltage source must be at a positive voltage potential which implies a dc offset to the output sinusoidal waveform. The resonant output pulse width will also be more than half of the cycle of the natural sinewave signal. Thus, each resonant pulse begins a short period before the current reaches its peak magnitude and ends a short period after the peak current has been reached in the opposition direction. Thus, the frequency of the control signal which is delivered to the MOSFET 16 is lower than the natural resonant frequency of the system.

Mathematically, the interval of the pulse is defined to start at $\omega t=-\phi$, where $\omega$ and t are as defined above, and $\phi$ is the phase difference between the beginning of the resonant pulse and the peak current in the supply. The duration of the actual pulse T is then defined by the equation:

$$T=(\pi+2\phi)/\omega \qquad (Eq.\ 6)$$

At the beginning of each resonant pulse, the current $I_b$ is defined by the equation:

$$I_b=I_o\cos\phi, \qquad (Eq.\ 7)$$

and the current at the end of the pulse $I_o$ is defined by the equation:

$$I_o=-I_o\cos(\pi+\phi). \qquad (Eq.\ 8)$$

At the end of each pulse, the MOSFET 16 is signaled by the control 18 to close, causing the voltage drop across it to drop to approximately zero and, in turn, the voltage to the load 14 to drop to approximately zero. The control 18 then causes the MOSFET 16 to remain on for a period of T.

During each flat segment, as illustrated in FIG. 4, the current of the inductor 12 reverses from negative to positive. When the current reaches $I_b$, the control 18 causes the MOSFET 16 to open again and the cycle repeats.

If the on-resistance of the MOSFET 16 is sufficiently small,- the necessary requirement for linear reversal through the inductor 12 can be approximated by the equation:

$$I_1 = (1/2)\frac{V_1}{L} T = (1/2) V_1 \sqrt{C/L}\ (\pi + 2\phi). \qquad (Eq.\ 9)$$

The critical parameter is $\phi$. The existence of a real solution can be found by combining equations 1, 6, 7 and 8 to establish the fixed-point condition for $\phi$:

$$I_1 = (1/2) V_1 \sqrt{C/L}\ (\pi + 2\phi) \qquad (Eq.\ 10)$$

-continued $$(V_o\sqrt{L/C})\cos\phi = (1/2)\sqrt{C/L}\,(\pi+2\phi)V_o\sin\phi \quad \text{(Eq. 11)}$$

$$\cos\phi = (\pi/2 + \phi)\sin\phi \quad \text{(Eq. 12)}$$
$$\cot\phi = \pi/2 + \phi \quad \text{(Eq. 13)}$$

The solution to Equation 9 can be found by a variety of numerical-solution techniques, such as Newton-Raphson iteration. The solution yields a numerical value for $\phi$ of 0.458 radians.

These equations apply for the case where there are no circuit losses. In a real-world circuit, obviously, there are losses. These losses are made-up for during the flat segment by increasing $\phi$ beyond the theoretical minimal value and thus fulfilling the third role of the inductor and clamping device.

A principal source of power loss in the embodiment of the invention shown in FIG. 3 is the resistance of the MOSFET 16 when it is on. Normally, this resistance can be decreased by increasing the input power to the MOSFET 16 from the control 18.

Increasing the input power to the MOSFET 16, unfortunately, also causes power loss. If $C_{sw}$ is the input capacitance of the MOSFET, the input power dissipated by the MOSFET is defined by the equation:

$$P_{sw} = FC_{sw}V^2. \quad \text{(Eq. 14)}$$

In turn, the total power dissipated by the circuit at a frequency F is:

$$P_{TOTAL} = P + P_{sw} = k_1 F^2 C^2 V^2 / C_{sw} + FC_{sc}V^2. \quad \text{(EQ. 15)}$$

For a large $C_{sw}$, the input power for the MOSFET will dominate the dissipation. For a small $C_{sw}$, on the other hand, the on-resistance losses of the MOSFET will dominate. An optimum value for the $C_{sw}$ can be derived. See W. C. Athas, "Energy-Recovery CMOS," (Massoud Pedram, editor) Kluwer Academic Publishers, 1995; W. C. Athas, L. Svensson, J. G. Koller, N. Tzartzanis, E. Y.-C.Chou, "Low Power Digital Systems Based on Adiabatic-Switching Principles," IEEE Trans on VLSI Systems, Vol 2, No. 4, Dec 1994; and D. Maksimovic, "A MOS Gate Drive With Resonant Transitions," Proc. IEEE Power Electronics Specialists Conf. IEEE Press, 1991. The minimum total power dissipation is:

$$P_{TOTAL_{MIN}} = 2\sqrt{K_1}\,F^{3/2}CV^2. \quad \text{(Eq. 16)}$$

Relating this equation to equation 1, the effective value of D is:

$$D = 2\sqrt{K_1 F}. \quad \text{(Eq. 17)}$$

Ideally, the dissipation factor should be proportional to F, rather than $F^{-1/2}$. The root of the problem lies in how the input power for the MOSFET is derived.

Other types of semiconductor switching devices exhibit similar trade-offs.

From a charge-model perspective, the magnitude of the controlling charge on the controlling electrode (e.g., the gate of a MOSFET) has a direct bearing on the charge quantity being controlled (e.g., the channel current of a MOSFET).

This relationship between the controlling and controlled charge leads to a minimization procedure and result as for the MOSFET.

Methods have been proposed to mitigate the problem by employing resonant charging to drive the input of the switching device See W. C. Athas, "Energy-Recovery CMOS," (Massoud Pedram, editor) Kluwer Academic Publishers, 1995; W. C. Athas, L. Svensson, J. G. Koller, N. Tzartzanis, E. Y. -C. Chou, "Low-Power Digital Systems Based on Adiabatic-Switching Principles," IEEE Trans on VLSI System, Vol 2, No 4, Dec 1994; and D Maksimovic, "A MOS Gate Drive With Resonant Transitions," Proc. IEEE Power Electronics Specialists Conf. IEEE Press, 1991. This approach is especially attractive for MOSFETs since the input is a capacitive load. Methods proposed have offered only negligible to modest improvement because of additional overhead in the form of increased timing complexity, large parasitic capacitances, and problems with inductor ringing.

A second approach to solving the problem has been to try to sum-up a set of harmonically related sine waves through a linear network to approximate the desired waveforms. See S. G. Younis, T. F. Knight, "Switchless Non-Dissipative Rail Drivers for Adiabatic Circuits," Proc. of the 1995 Chapel-Hill Conf. on VLSI, Apr. 1995. It has not been possible so far to implement such circuits in practice because of their extreme sensitivity to phase coherence.

Figure 5:
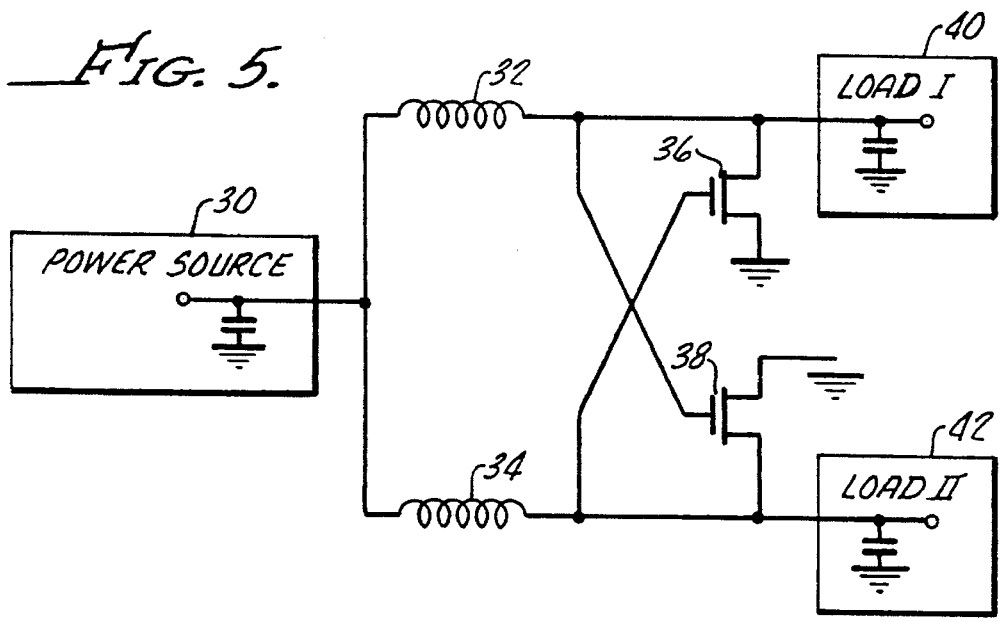
FIG. 5 is another embodiment of the present invention.

The alternate embodiment of the invention shown in FIG. 5 avoids these problems by exploiting the circuit's symmetry and the threshold effect of the MOSFET devices. The system shown in FIG. 5 includes a power source 30 and a complementary set of inductors 32 and 34, MOSFETs 36 and 38, and loads 40 and 42.

The control 18 shown in FIG. 3 for each of the MOSFETs 36 and 38 shown in FIG. 5 is simply the output from the complementary circuity section. Since the input power to each MOSFET is now part of the complementary section's output load capacitance, the formula for power dissipation is:

$$P_{TOTAL} = P + P_{sw} = k_1 F^2 (C + C_{sw})^2 V^2 / C_{sw}. \quad \text{(Eq. 18)}$$

Setting $C = C_{sw}$ minimizes dissipation. With this equivalency, the corresponding dissipation factor can be expressed as:

$$D = 2k_1 F. \quad \text{(Eq. 19)}$$

As can be seen from this equation, the power factor scales linearly with frequency. As an additional benefit, the large optimal capacitance for $C_{sw}$ does not introduce substantial ringing with the inductor because, when the circuit is not in the resonant pulse mode, the large capacitance is tied to ground.

For symmetry, the value of the inductance 32 should equal the value of the inductance 34. Similarly, the input capacitance to the load 40 should equal the input capacitance to the load 42.

The invention is also useful for driving loads, such as VLSI chips, which utilize the pulses, not merely for clock signals, but as the source of power for the chip. To do this, the load itself must be designed to function with a supply voltage that consists of the pulse trains generated by the subject invention.

Figure 6:
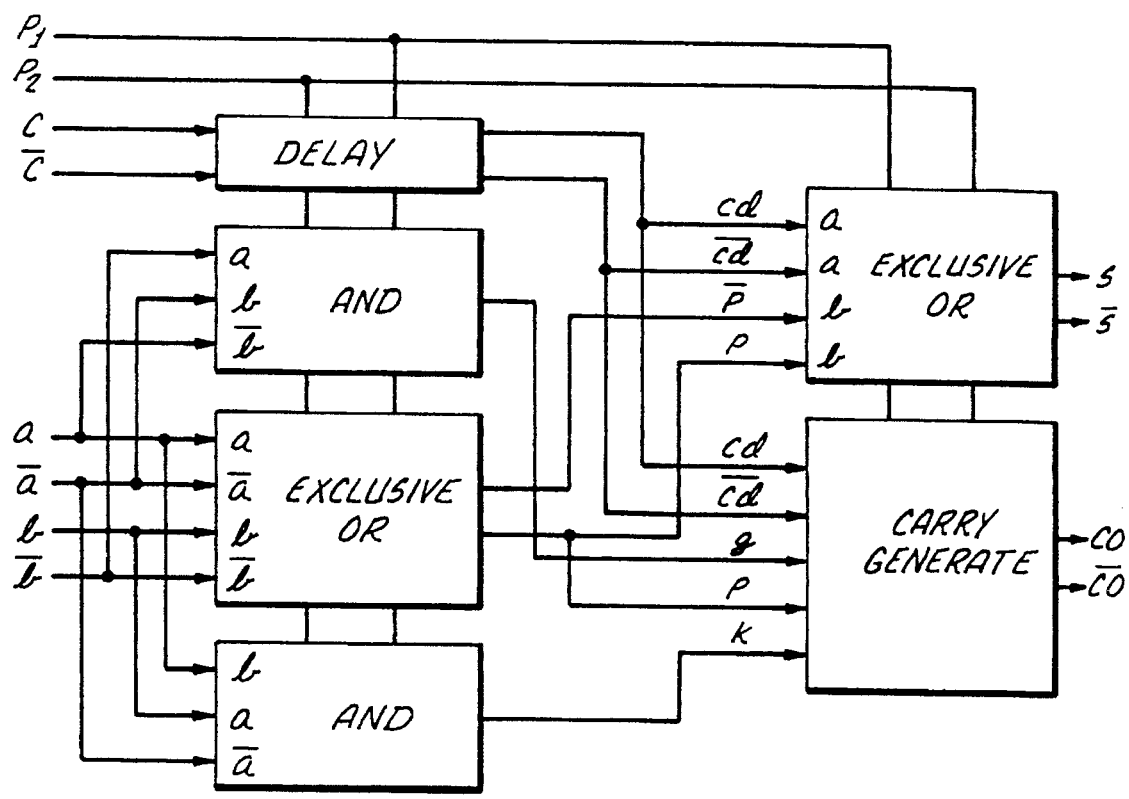
FIG. 6 is a block diagram of a pipelined full adder, but modified to be powered entirely by the complementary, resonant pulses generated by the subject invention.

FIG. 6 is a block diagram of a pipelined full adder, but modified to be powered entirely by the complementary resonant pulse signals generated by the invention, such as the embodiment of the invention shown in FIG. 5. P1 and P2 are the complementary, resonant pulse signals. A, $\bar{a}$, b, $\bar{b}$, c and $\bar{c}$ are the standard signals to such a filter. S(sum), $\bar{s}$, co (carry out) and $\overline{co}$ are the standard output signals.

Figure 7:
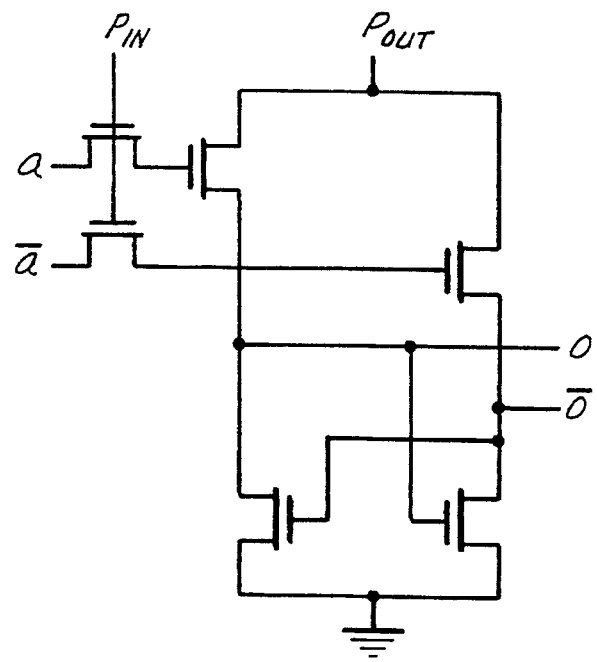
FIG. 7 illustrates one embodiment of a circuit for the Delay section shown in FIG. 6.
Figure 8:
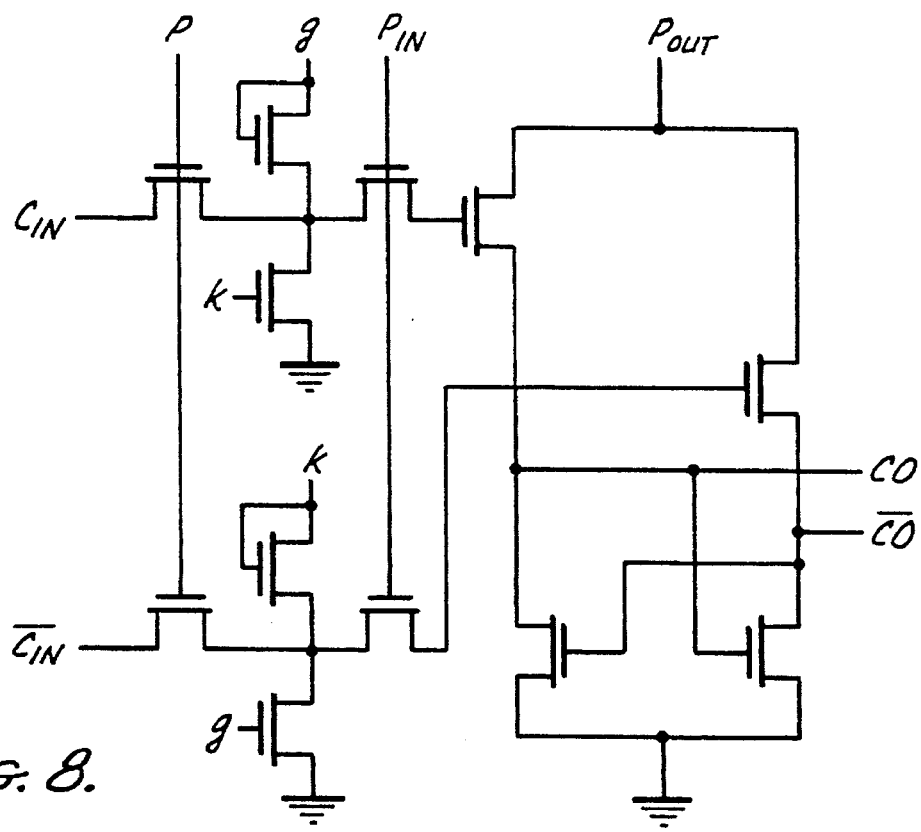
FIG. 8 illustrates one embodiment of a circuit for the Carry-Generate section shown in FIG. 6.
Figure 9:
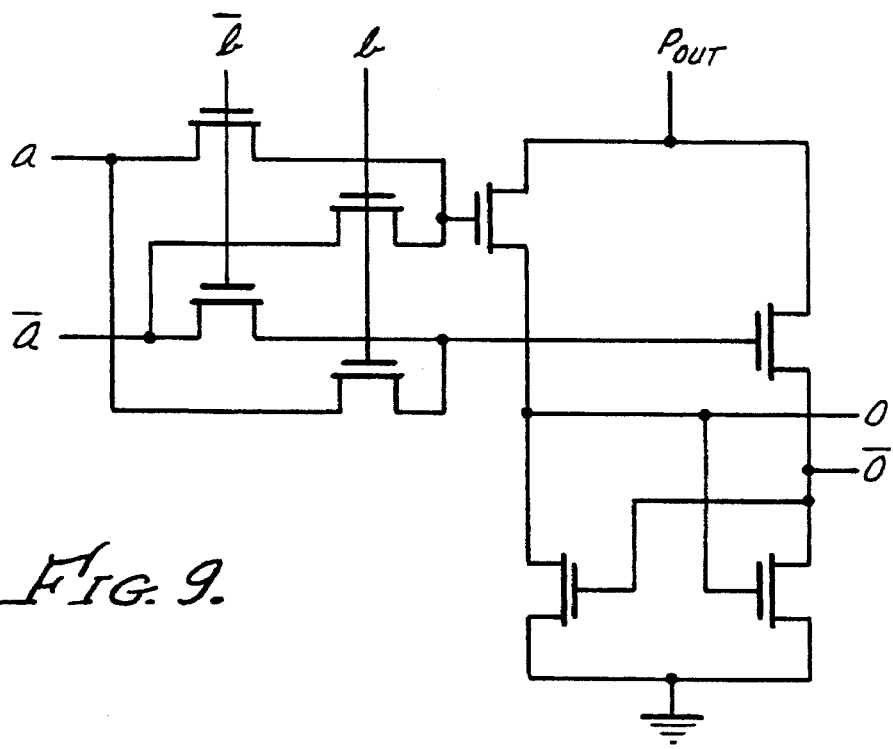
FIG. 9 illustrates one embodiment of a circuit for the two Exclusive-Or sections shown in FIG. 6.
Figure 10:
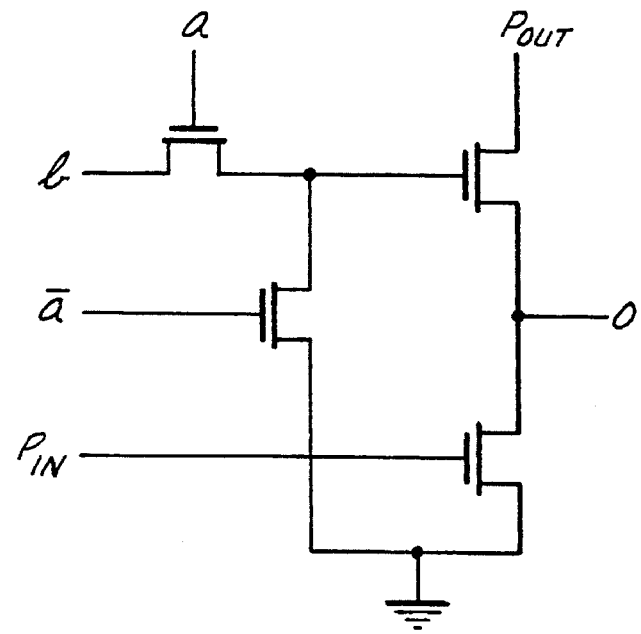
FIG. 10 illustrates one embodiment of a circuit for the two And sections shown in FIG. 6.

As can also be seen in FIG. 6, the pipelined full adder includes a Delay section, two And sections, two Exclusive Or sections, and a Carry-Generate section. FIGS. 7–10 illustrate embodiments of circuitry which can be used for each of these sections. Specifically, FIG. 7 illustrates an embodiment of a Delay circuit; FIG. 8 illustrates an embodiment of a Carry-Generate circuit; FIG. 9 illustrates an embodiment of an Exclusive-Or circuit; and FIG. 10 illustrates an embodiment of the And circuit. Although other types of semiconductor devices can be used, the semiconductor devices shown in FIGS. 7 through 10 are preferably nFETs. Similar circuits are described in C. L. Seitz, A. H. Frey, S. Mattisson, S. D. Rabin, D. A. Speck, J. L. A. van de Snepscheut, "Hot-Clock nMOS," Proc. of the 1985 Chapel-Hill Conf on VLSI, Apr. 1985.

Figure 11:
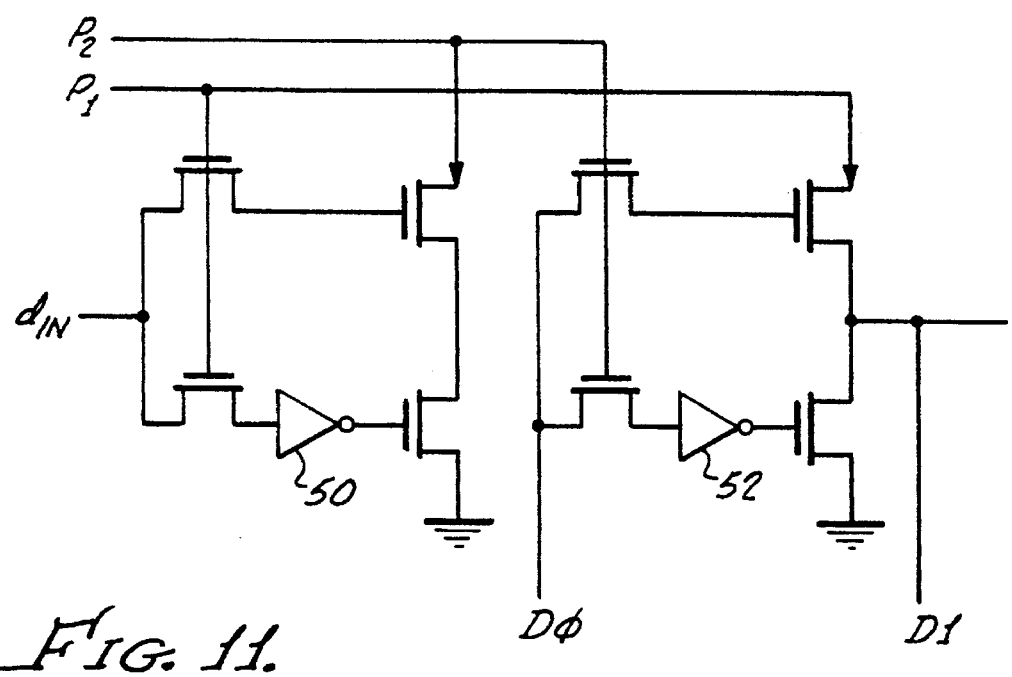
FIG. 11 illustrates a shift-register circuit which can be partially powered by the complementary, resonant pulses generated by the invention.

FIG. 11 illustrates a still further embodiment of a circuit which can be partially powered by the complementary, sinusoidal pulses which are generated by one embodiment of the invention, such as the embodiment shown in FIG. 5. The circuitry shown in FIG. 7 is a CMOS shift register. Again, although other types of semiconductor devices could be used, they are preferably nFETs and pFETs.

It is noted that FIG. 11 includes inverters 50 and 52 which, unlike the rest of the circuitry, require a traditional source of continuous DC for power. FIG. 11 thus illustrates the principle that the present invention can be used to power circuits in part, rather than only in whole or not at all.

The specific embodiments of the invention have been described in detail herein with reference to the accompanying drawings. But it is to be understood that the invention is not limited to these embodiments. Various changes and modifications may be effected by one skilled in the art without departure from the scope or spirit of the invention as defined in the appended claims.

For example, it is by no means necessary that the inductor be connected in series between the source of power and the load. The inductor can be connected in parallel.

Although the flat sections of the signal generated by the present invention have thus-far been illustrated as having a substantially zero voltage, it is to be understood that the actual voltage level could be positive or negative, depending upon offsets which are intrinsic to the circuit which is actually used.

Similarly, it is by no means essential that a MOSFET be used as the clamping device. Other types of semiconductor devices might be used instead, as well as other types of electronic switching devices and control devices.

Thus far, moreover, the illustrations of the various embodiments of the invention have utilized extremely basic circuitry with very few components. It is contemplated that circuitry implementing the present invention might well have many additional components and might well have vastly different configurations.

In short, the invention is limited solely by the following claims.

We claim:

1. A pulse generating circuit for generating a first and second stream of pulses, each pulse having a substantially sinusoidal shape, the first stream being complementary in phase to the second for driving a first load having a first input capacitance, the second stream for driving a second load having a second input capacitance, comprising:

A. a power source having an output capacitance;

B. a first inductor connected to said power source and the first load which cooperates with the output capacitance and the first input capacitance to generate the first stream of sinusoidal pulses;

C. a second inductor connected to said power source and the second load which cooperates with the output capacitance and the second input capacitance to generate the second stream of sinusoidal pulses;

D. a first clamping device connected to said first inductor for preventing the stream of pulses which are driving the first load from exceeding a clamping level, said first clamping device being connected to and driven by the second stream of pulses; and E. a second clamping device connected to said second inductor for preventing the stream of pulses which are driving the second load from exceeding a clamping level, said second clamping device being connected to and driven by the first stream of pulses.

2. The circuit of claim 1 wherein:

A. said first clamping device includes an electronic switch having a control input connected to the second stream of pulses; and B. said second clamping device includes an electronic switch having a control input connected to the first stream of pulses.

3. The circuit of claim 2 wherein each of said electronic switches is a MOSFET.

4. The circuit of claim 1 wherein the inductance of said first inductor is substantially the same as said second inductor.

5. The circuit of claim 1 wherein each control signal operates at a frequency which is less than the frequency at which, each of said inductors resonate with the output capacitance and the input capacitance to which it is connected.

6. The circuit of claim 5 wherein the frequency of said control signal has a period which is substantially 0.458 radians longer than the period of the resonant frequency.

7. The circuit of claim 1 wherein each of said clamping devices prevents the stream of pulses which it clamps from reversing in polarity.

8. The circuit of claim 1 wherein said power source is a DC power source.

9. A pulse generating circuit for driving a load having an input capacitance with a stream of pulses, each pulse having a substantially sinusoidal shape, comprising:

A. a power source having an output capacitance;

B. an inductor connected to said power source and to the load which cooperates with the output capacitance and the input capacitance to generate the stream of sinusoidal pulses; and C. a clamping device connected to said inductor for preventing the stream of pulses which are driving the load from exceeding a clamping level.

10. The circuit of claim 9 wherein

A. said clamping device includes an electronic switch having a control input to control said clamping in response to a control signal; and B. said circuit further includes control apparatus for generating said control signal.

11. The circuit of claim 10 wherein the control signal is generated at a frequency which is less than the frequency at which said inductor resonates with the output capacitance and the input capacitance.

12. The circuit of claim 10 wherein the frequency of said control signal has a period which is substantially 0.458 radians longer than the period of the resonant frequency.

13. The circuit of claim 10 wherein said electronic switch is a MOSFET.

14. The circuit of claim 9 wherein said clamping device prevents the stream of pulses which are driving the load from reversing in polarity.

15. The circuit of claim 9 wherein said power source is a DC power source.

16. The circuit of claim 9 wherein said clamping device, when clamped, further causes:

A. a reversal in the direction of the current through said inductor;

B. returns and extracts energy from said power source; and

C. replenishes losses in the circuit with power from said power source.

17. A pulse generating circuit for driving a load having an input capacitance with a stream of pulses, each pulse having a substantially sinusoidal shape, comprising:

A. a power source having an output capacitance which periodically absorbs and stores power from the load;

B. an inductor connected to said power source and the load to be driven which periodically absorbs and stores power from the load; and C. a clamping device connected to said inductor for preventing the stream of pulses which are driving the load from exceeding a clamping level.

18. A process for driving a load having an input capacitance with a stream of pulses having a substantially sinusoidal shape from a power source having an output capacitance and an inductor connected to the power source and the load including the steps of:

A. generating a substantially sinusoidal current in a resonating circuit which includes the inductor and input capacitance;

B. clamping the voltage created by the substantially sinusoidal current so that it does not exceed a clamping level; and C. delivering the clamped voltage to the load to be driven.

19. An electronic circuit comprising:

a. a load having an input capacitance;

b. a power source having an output capacitance;

c. an inductor connected to said power source and to said load which cooperates with said output capacitance and said input capacitance to generate a stream of substantially sinusoidal pulses; and d. a clamping device connected to said inductor for preventing the stream of pulses which are driving said load from exceeding a clamping level.

20. The circuit of claim 19 further including an LCD having row and select lines wherein said lines constitute said load.

21. The circuit of claim 19 further including a microelectromechanical device which constitutes said load.

22. The circuit of claim 19 further including a MOS VLSI chip, connections to which constitute said load.

23. The circuit of claim 19 further including a bootstrap circuit which constitutes said load.

24. The circuit of claim 19 further including a CMOS circuit which constitutes said load.

25. The circuit of claim 19 further including an adiabatic CMOS circuit which constitutes said load.

26. The circuit of claim 19 wherein said load is powered at least in part by the stream of pulses.

\* \* \* \* \*

UNITED STATES PATENT AND TRADEMARK OFFICE
CERTIFICATE OF CORRECTION

PATENT NO. : 5,559,478
DATED : September 24, 1996
INVENTOR(S) : William C. Athas, Lars G. Svensson It is certified that error appears in the above-indentified patent and that said Letters Patent is hereby corrected as shown below:

Column 1, line 52, after "1985" insert a period -- . --.

Column 6, line 10, before "return" insert -- 4 --.

Signed and Sealed this

Second Day of December, 1997

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,559,478
DATED : September 24, 1996
INVENTOR(S) : William C. Athas, Lars G. Svensson It is certified that error appears in the above-indentified patent and that said Letters Patent is hereby corrected as shown below:

In the drawing, sheet 1, FIG. 5, the top right lead of transistor 38 should be connected to the adjacent ground element, and sheet 5, FIG 11, should appear as follows.

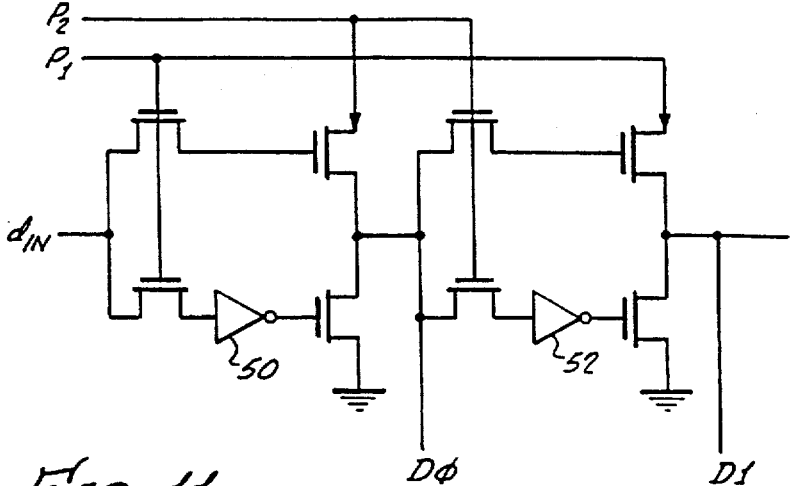

Signed and Sealed this

Thirtieth Day of December, 1997

Attest:

BRUCE LEHMAN

*Attesting Officer*  *Commissioner of Patents and Trademarks*